United States Patent [19]

Kroner et al.

[11] Patent Number: 5,453,651
[45] Date of Patent: Sep. 26, 1995

[54] DRIVE UNIT WITH AN ELECTRIC MOTOR FOR OPERATING A PLURALITY OF ADJUSTING DEVICES

[75] Inventors: Gregor Kroner, Gundelsheim; Hans Rampel, Ahorn/Schorkendorf; Georg Scheck, Weitramsdorf; Carsten Brandt, Weidach; Thomas Bertolini, Diersheim; Siegfried Reichmann, Rheinau-Freistett, all of Germany

[73] Assignee: Brose Fahrzengteile GmbH & Co., Coburg, Germany

[21] Appl. No.: 320,122

[22] Filed: Oct. 7, 1994

Related U.S. Application Data

[63] Continuation of Ser. No. 144,800, Oct. 27, 1993, abandoned.

[30] Foreign Application Priority Data

Oct. 27, 1992 [DE] Germany ............ 42 37 133.3
Sep. 28, 1993 [DE] Germany ............ 43 33 726.0

[51] Int. Cl.[6] .................. H02K 23/44; H02K 7/12; H02K 7/10; F16C 3/03
[52] U.S. Cl. ................ 310/209; 310/75 D; 310/84; 310/118; 464/162
[58] Field of Search .................. 310/75 D, 84, 310/78, 100, 118, 191, 209; 464/69, 162, 167; 192/34, 48.9, 48.91, 84 R, 67 R, 108; 74/10.2, 69, 125.5

[56] References Cited

U.S. PATENT DOCUMENTS

| 3,872,336 | 3/1975 | Lin et al. | 310/78 |
| 5,009,296 | 4/1991 | Ohkawa et al. | 192/20 |
| 5,092,197 | 3/1992 | Hauger | 74/665 GA |

FOREIGN PATENT DOCUMENTS

| 0418516A2 | 3/1991 | European Pat. Off. |
| 2558781 | 2/1985 | France . |
| 3403246 | 8/1985 | Germany . |
| 63-162348 | 7/1988 | Japan . |
| 2153218 | 8/1985 | United Kingdom . |

OTHER PUBLICATIONS

Japanese Patent Abstract, Publication No. 162348(A), Publication Date Nov. 11, 1988, p. 11.

Primary Examiner—Clayton E. LaBalle
Attorney, Agent, or Firm—Christie, Parker & Hale

[57] ABSTRACT

A drive unit with an electric motor (2) for operating a plurality of adjusting devices and axially displaceable coupling elements, in particular for two adjusting devices for a vehicle seat. An electric motor (2) has a motor shaft (20) consisting of a hollow shaft (21) and an axially displaceable interior shaft (22) received therein in a manner fixed against relative rotation which can be connected on both sides, which can be selectively connected in a manner fixed against relative rotation with associated coupling elements (41, 42) of the adjusting devices by coupling elements (23', 24') on the motor side.

7 Claims, 2 Drawing Sheets

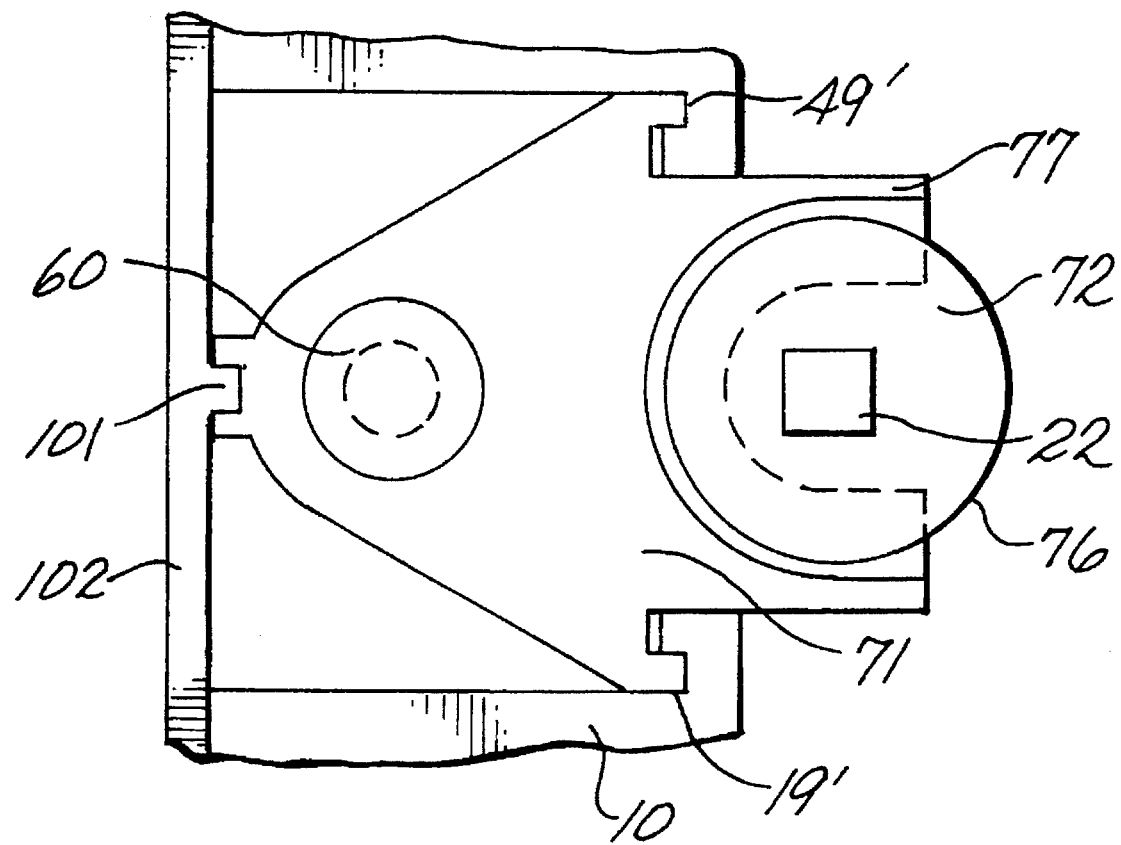

DRIVE UNIT WITH AN ELECTRIC MOTOR FOR OPERATING A PLURALITY OF ADJUSTING DEVICES

CROSS-REFERENCE TO RELATED APPLICATION

This is a continuation of application Ser. No. 08/144,800, filed Oct. 27, 1993, now abandoned.

FIELD OF THE INVENTION

The invention relates to a drive unit with an electric motor for operating a plurality of adjusting devices and axially displaceable coupling elements, in particular for two adjusting devices for a vehicle seat or other adjustable automobile component.

BACKGROUND OF THE INVENTION

A drive unit with an electric motor for operating a plurality of adjusting devices for a vehicle seat is known from Japanese Patent Application 63-162 348 (A), wherein the electric motor is rotatably disposed in a cylinder-shaped housing and can be rotated parallel to its own longitudinal axis. The motor shaft and the input shafts of the adjusting devices are respectively provided with electromagnetic couplings. It is possible in this way to connect the motor shaft of the electric motor selectively with one of the input shafts of the adjusting devices.

The spatial displacement of the entire electric motor, however, requires much space and the availability of strong displacement forces, and an elaborate motor seating is also required to assure precise switching processes. Thus, the electric motor of the known device in seated in a cylinder-shaped housing which completely encloses the electric motor. However, this negatively affects the cooling of the motor and in this way reduces the available output of the motor.

A vehicle seat which can be adjusted by means of an electric motor is also known from German Patent Publication DE 34 03 246 A1, in which a single electric motor is assigned to a plurality of adjusting devices and the drive shaft of the electric motor can be selectively connected with one of the input shafts of the adjusting devices. The electric motor in this case can be mounted stationary on the seat frame of the vehicle seat and can be brought selectively into engagement with corresponding, axially displaceable coupling pieces for the individual adjusting device.

But since the individual adjusting devices are disposed at very different places on the vehicle seat, a shaft connection from the respectively associated coupling piece to the input shaft of the respective adjusting device is always required. The movable seating of the coupling pieces, however, is considerably elaborate.

For this reason, in another embodiment the electric motor is seated on the seat frame, so its location can be changed and it can be selectively displaced or pivoted into positions in which its drive shaft comes into engagement with a respectively stationary seated coupling piece which is respectively connected in a manner fixed against relative rotation via a shaft connection with the input shaft of an associated adjusting device. However, the variable seating of the complete electric motor on the seat frame requires a great structural outlay, as already explained above.

SUMMARY OF THE INVENTION

The present invention provides a compact drive unit with an electric motor for the operation of a plurality of adjusting devices and axially displaceable coupling elements, which allows a decrease of the moved masses and thus a reduction of the power and space requirements during the switching operations. At the same time the drive unit prevents a reduction of the efficiency caused by heat accumulation and assures a high degree of precision during switching operations. Specifically, the electric motor has a shaft which can be coupled on both sides, consisting of a hollow shaft and an axially displaceable interior shaft connected therewith in a manner fixed against relative rotation, which projects beyond the hollow shaft, and that the interior shaft can be selectively connected in a manner fixed against relative rotation with associated coupling elements of the adjusting devices by means of coupling elements on the motor side.

The invention provides a drive unit with an electric motor for operating a plurality of adjusting devices and with axially displaceable coupling elements disposed on the interior shaft, in particular for two adjusting devices of a vehicle seat which, by a pronounced decrease of the moved masses has considerably reduced power and space requirements. The invention also assures a high degree of precision during the switching operations and an optimal use of the capacity of the motor used. Because the motor shaft is in the form of a hollow shaft with an interior shaft axially displaceable therein, the drive unit can be made very compact. The coupling elements on the motor side can be fixedly connected with the interior shaft.

In accordance with an advantageous embodiment, the ends of the interior shaft itself are formed as coupling elements. This results in a reduction in the number of components and has an advantageous effect on the manufacturing and assembly costs.

BRIEF DESCRIPTION OF THE DRAWINGS

The features of a specific embodiment of the best mode contemplated of carrying out the invention are illustrated in the drawings, in which:

FIG. 2 is a section view along the section line A—A of FIG. 1.

DETAILED DESCRIPTION OF THE SPECIFIC EMBODIMENT

Figure 1:
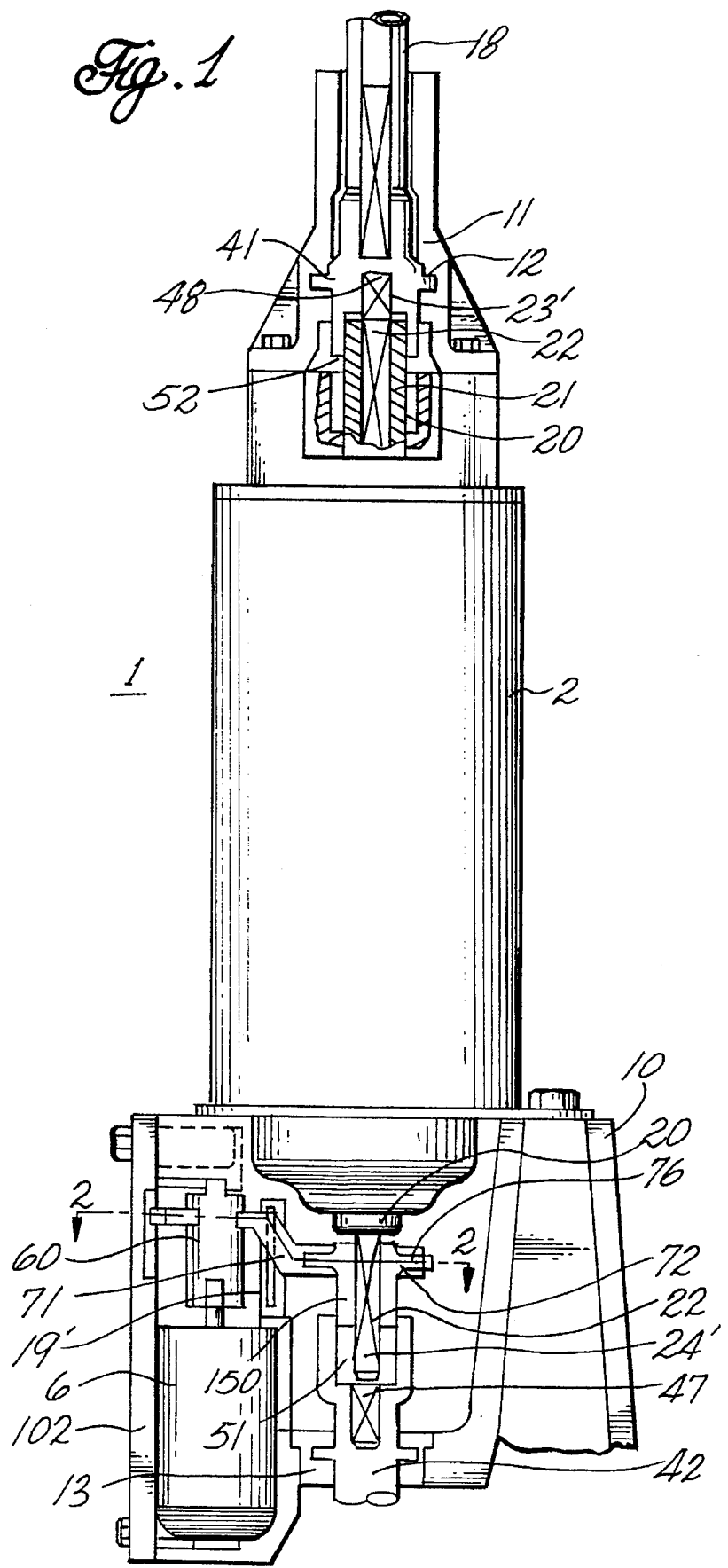
FIG. 1 is a schematic view of a drive unit with an electric motor, the motor shaft of which consists of an exterior hollow shaft and an interior shaft arranged therein in an interlocked and longitudinally adjustable manner.

FIGS. 1 and 2 schematically show an exemplary embodiment of a drive unit 1 with an electric motor 2 for operating two adjusting devices of a vehicle seat, sliding roof, or other adjustable automobile component. The electric motor 2 has a motor shaft 20 which can be connected to adjusting devices on both sides and consists of a hollow exterior shaft 21 and an interior shaft 22 keyed to rotate together. Interior shaft 22 is free to move axially relative to exterior shaft 21 and the housing of motor 2. As described below, interior shaft 22 can be selectively connected to the associated coupling elements 41, 42 of the adjusting devices in a manner fixed against relative rotation. As a result, motor 2 can impart rotation to either of the adjusting devices.

The interior shaft 22 projects beyond the exterior shaft 21 and is in the form of a polyhedral, so that its ends 23' are used as coupling elements on the motor side, which can be selectively connected in a manner fixed against relative rotation with stationary coupling elements 41, 42 associated respectively with an adjusting device.

The coupling elements 41, 42 assigned to the adjusting devices are seated in a stationary manner, but rotatable, in bearing bushings 12, 13, which are disposed in the housing 10 or an oppositely located holder 11.

A servomotor 6 for the axial displacement of the interior shaft 22 is disposed in the housing 10 of the drive unit. By means of a gear consisting of a spindle shaft 60, a displacement dog 71 threaded on shaft 60, and a switching bushing 72 axially fixedly connected to the interior shaft 22, the rotary movement of the servomotor 9 is changed into a linear or axial movement of dog 71, so that the interior shaft 22 is axially displaced when the servomotor 9 is actuated. In this case the displacement dog 71 is guided axially in respect to the spindle shaft 60 in grooves 19' of the housing 10 and on a bar 101 of a housing cover 102 as spindle shaft 60 rotates (see FIG. 42).

Furthermore, the displacement dog 71 has a C-shaped support collar 77, which is connected to a flange 76 of the switching bushing 72 in an axially interlocking manner so flange 72 and shaft 22 can rotate relative to dog 71. As can be further seen in FIG. 1, the housing 10 of the drive unit can be directly mounted on an adjusting unit so the associated coupling element 42 is rotatably seated in bearing bushing 13. On the other hand, a second, remotely disposed adjusting device can be connected in a manner fixed against relative rotation via a flexible shaft 18 with the associated coupling element 41 disposed in the oppositely located holder 11.

In the position shown in FIG. 1, the upper end 23' of the interior shaft 22 is in engagement with a correspondingly formed polyhedral recess 48 in the coupling element 41, while the lower end 24' of the interior shaft 22 is out of engagement with the correspondingly formed polyhedral recess 47 in the coupling element 42. Axial alignment, however, is maintained with coupling element 42 because the cylindrical collar 50 on switching bushing 72 rotates snugly within a cylindrical bore 51 of coupling element 42.

In the other position the lower end 24' of the interior shaft 22 is in engagement with a correspondingly formed polyhedral recess 47 in the coupling element 42, while the upper end 23' of the interior shaft 22 is out of engagement with the correspondingly formed polyhedral recess 48 in the coupling element 41. Axial alignment, however, is maintained with coupling element 41 because the exterior shaft 21 rotates snugly within a cylindrical bore 52 of coupling element 41.

If required, the axial displacement of the interior shaft 22 can take place in such a way that either only one or both of the coupling elements 41, 42 associated with the adjusting devices can be brought into an engagement fixed against relative rotation.

The disclosure of the German Priority patent application Ser. No. P 42 37 133.3 published on Apr. 28, 1994, is incorporated fully herein by reference.

The design of the invention is not restricted to the above elucidated embodiment mode. Rather a number of variations are conceivable which, resorting to the solution above, shall employ basically different implementations.

What is claimed is:

1. A drive unit to selectively actuate plural adjusting systems comprising:

an electric motor having a rotatable non-translatable hollow outer shaft and an axially translatable inner shaft disposed inside the outer shaft, the inner shaft being keyed to rotate with the outer shaft;

a first rotatable, nontranslatable coupling element;

a second rotatable, nontranslatable coupling element;

means for axially moving the inner shaft between a first position and a second position;

means in the first position for coupling rotation from the motor to the first rotatable coupling element without rotating the second rotatable coupling element; and means in the second position for coupling rotation from the motor to the second rotatable coupling element without rotating the first rotatable coupling element.

2. The drive unit of claim 1, in which the means for coupling rotation from the motor to the first rotatable coupling element comprises a polyhedral end on the inner shaft adjacent to the first coupling element and a polyhedral recess in the first coupling element for receiving the polyhedral end in the first position.

3. The drive unit of claim 2, in which the means for coupling rotation from the motor to the second rotatable coupling element comprises a polyhedral end on the inner shaft adjacent to the second coupling element and a polyhedral recess in the second coupling element for receiving the polyhedral end in the second position.

4. The drive unit of claim 1, in which the means for coupling rotation from the motor to the second rotatable coupling element comprises a polyhedral end on the inner shaft adjacent to the second coupling element and a polyhedral recess in the second coupling element for receiving the polyhedral end in the second position.

5. The drive unit of claim 1, in which the first coupling element has a cylindrical bore in which the outer shaft rotates to align axially the coupling elements and the inner shaft.

6. The drive unit of claim 5, in which the means for axially moving the inner shaft includes a collar fixed around the inner shaft adjacent to the second coupling element and the second coupling element has a cylindrical bore in which the collar rotates in both the first and second positions to align axially the coupling elements and the inner shaft.

7. The drive unit of claim 1, in which the means for axially moving the inner shaft includes a collar fixed around the inner shaft adjacent to the second coupling element and the second coupling element has a cylindrical bore in which the collar rotates in both the first and second positions to align axially the coupling elements and the inner shaft.

* * * * *